(12) United States Patent
Medvedovsky et al.

(10) Patent No.: US 10,938,851 B2
(45) Date of Patent: Mar. 2, 2021

(54) TECHNIQUES FOR DEFENSE AGAINST DOMAIN NAME SYSTEM (DNS) CYBER-ATTACKS

(71) Applicant: RADWARE, LTD., Tel Aviv (IL)

(72) Inventors: Lev Medvedovsky, Netanya (IL); David Aviv, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 406 days.

(21) Appl. No.: 15/940,371

(22) Filed: Mar. 29, 2018

(65) Prior Publication Data

US 2019/0306188 A1  Oct. 3, 2019

(51) Int. Cl.
*H04L 29/06* (2006.01)
*H04L 29/12* (2006.01)
*H04L 12/743* (2013.01)

(52) U.S. Cl.
CPC ...... *H04L 63/1458* (2013.01); *H04L 45/7453* (2013.01); *H04L 61/1511* (2013.01); *H04L 63/1425* (2013.01); *H04L 2463/142* (2013.01)

(58) Field of Classification Search
None
See application file for complete search history.

(56) References Cited

U.S. PATENT DOCUMENTS

| | | | |
|---|---|---|---|
| 7,836,496 B2 | 11/2010 | Chesla et al. | |
| 7,930,428 B2 | 4/2011 | Drako | |
| 8,484,377 B1 | 7/2013 | Chen et al. | |
| 9,026,676 B1 | 5/2015 | Chen et al. | |
| 9,172,713 B2 | 10/2015 | Joffe et al. | |
| 9,979,588 B1* | 5/2018 | Benson | H04L 61/106 |
| 9,985,984 B1* | 5/2018 | Chavez | H04L 63/1441 |
| 2005/0086520 A1* | 4/2005 | Dharmapurikar | H04L 63/145 726/4 |
| 2008/0028073 A1 | 1/2008 | Trabe et al. | |
| 2011/0126292 A1* | 5/2011 | Ferg | H04L 63/101 726/26 |
| 2012/0022942 A1 | 1/2012 | Holloway et al. | |
| 2012/0297478 A1 | 11/2012 | Martin et al. | |
| 2014/0245436 A1 | 8/2014 | Dagon et al. | |
| 2015/0180892 A1 | 6/2015 | Balderas | |
| 2016/0044017 A1 | 2/2016 | Joffe et al. | |
| 2016/0057166 A1* | 2/2016 | Chesla | H04L 63/14 726/23 |
| 2016/0065611 A1 | 3/2016 | Fakeri-Tabrizi et al. | |
| 2016/0150004 A1 | 5/2016 | Hentunen | |
| 2016/0234249 A1 | 8/2016 | Wong | |
| 2017/0250998 A1* | 8/2017 | Miliefsky | H04L 63/02 |
| 2019/0068634 A1* | 2/2019 | Fakeri-Tabrizi | H04L 63/1441 |

* cited by examiner

*Primary Examiner* — Fatoumata Traore
(74) *Attorney, Agent, or Firm* — M&B IP Analysts, LLC

(57) ABSTRACT

A method and system for detecting and mitigation recursive domain name system (DNS) cyber-attacks are disclosed. The method includes receiving DNS queries directed to a DNS resolver, wherein the DNS resolver is communicatively connected between at least one client and at least one name server; parsing each received DNS query to extract a hostname identified therein; updating at least one array of Bloom filters using the extracted hostname; computing a ratio of an unrecognized hostnames per sample (UPS) based on the contents of the at least one array; and determining if the UPS ratio is abnormal, wherein an abnormal UPS ratio is an indication of an attack.

21 Claims, 7 Drawing Sheets

TECHNIQUES FOR DEFENSE AGAINST DOMAIN NAME SYSTEM (DNS) CYBER-ATTACKS

TECHNICAL FIELD

This disclosure generally relates to implementation of cyber-security techniques for detection of distributed denial of service (DDoS) domain name system (DNS) attacks.

BACKGROUND

A significant problem facing the Internet community is that online businesses and organizations are vulnerable to malicious attacks. Cyber-attacks have been executed using a wide arsenal of attack techniques and tools targeting both information maintained by online businesses and their IT infrastructures. Cyber-attacks typically aim to steal data, disable applications or services, or damage online assets of organizations. For example, a domain name system (DNS)-based distributed denial-of-service (DDoS) attack is an example of an attack that can damage a network infrastructure and disable applications, services, and websites.

One method for executing DNS-based DDoS attacks is by exploiting recursive DNS resolvers to send a query flood to authoritative DNS servers. Such attacks are collectively referred to as a recursive random subdomains attack. Execution of such an attack is described herein with respect to FIG. 1. A recursive random subdomain attack can also target the recursive resolver itself by consuming CPU resources and denying service from legitimate customers.

A recursive DNS resolver 110 is deployed between a client device 120 and a plurality of authoritative DNS name servers 130-1 through 130-n. The client device 120 sends a recursive query to the DNS resolver 110 including a query name. The DNS resolver 110 returns an internet protocol (IP) address corresponding to the query name. A query name typically includes one or more labels delimited by periods that are translated from right ("top level domain") to left ("sub domain"). For example, in a full hostname "www-.mail.example.com.", the root level is represented by the '.', top level domain is ".com", the domain is "example.com. A full hostname is also referred to as a fully qualified domain name (FQDN).

An authoritative DNS name server 130 answers only the queries for the zone (a domain name space) that it is responsible for in order to quickly respond to resolver queries. An authoritative name server 130 does not respond to recursive queries directly and does not cache query results.

To resolve a FQDN, the DNS recursive server (also referred to as a DNS recursive resolver) 110 first checks if an internet protocol (IP) address for the domain name is saved in its cache. If so, the IP address is returned in a query response. If the query cannot be resolved based on the cached information, the DNS recursive resolver 110 queries a root DNS server (e.g., the name server 130-1).

If the root name server 130-1 is authoritative for the top-level domain (e.g., ".com"), the server 130-1 refers the resolver to the next authoritative DNS name server for the domain (e.g., "example.com"). The name server (e.g., the name server 130-2) delegated by the root name server 130-1 refers the query to yet another DNS server (e.g., the name server 130-n) that is authoritative for the next sub domain level (e.g., "s1.example.com"). This trail of referrals continues until the FQDN is resolved. Thus, queries are often forwarded to multiple authoritative DNS name servers 130 before being fully resolved. The recursive resolver continues until the name server in charge of the domain (e.g., "www.s1.example.com") returns the IP address to the recursive resolver, which forwards it to the original requester.

The full domain name can also be resolved by querying only one authoritative DNS server if the DNS recursive resolver 110 has knowledge about such a name server. A domain name fully resolved by one of the name servers 130-1 through 130-n may be cached at the DNS resolver 110 and returned as a query response to the client 120.

If the root name server 130-1 is not authoritative for a particular top-level domain name, the root name server 130-1 refers the query to other authoritative DNS name servers 130 that may be able to resolve the query.

DNS queries and responses are vulnerable to various forms of malicious activity. A recursive DNS attack targets the recursive DNS resolver 110 to achieve denial of service for legitimate users using the same resolution service. To this end, during a recursive DNS attack, the attacker generates multiple DNS queries using forged and random full or sub domain names. The recursive DNS resolver 110 triggers the resolution process discussed above to resolve these queries, as the responses are often not cached. Handling a large magnitude of recursive DNS queries overloads the operation of the DNS resolver 110. Furthermore, a crafted recursive random subdomain attack can also flood a specific target domain.

As attackers become more sophisticated, a typical DDoS-based DNS attack includes a high volume of malicious DNS queries with noisy hostnames to be resolved. Such attacks are carried out by botnets capable of issuing millions of DNS queries within a few seconds, thereby quickly bringing the resolver to complete denial of service. Noisy hostnames are randomly generated hostnames with the same domain name. For example, during a recent DDoS-based DNS attack (known as "Thanksgiving"), some of the exemplary DNS queries to be resolved were (wlfdklmuobh.researchgate.net; anyd.researchgate.net; ezqrmjarmd.researchgate.net; ohstulqroz.researchgate.net; kpcb.researchgate.net; upefwfub.researchgate.net; yhkzsb.researchgate.net). The domain name is researchgate.net, while the noisy hostnames (randomly generated) are: wlfdklmuobh, kpcb, ezqrmjarmd, ohstulqroz, kpcb, upefwfub, and yhkzsb.

Existing cyber-security solutions are not effective or efficient in detecting DDoS-based DNS attacks. Typically, such solutions are designed to block recursive DNS queries using a black list. A black list includes domain names currently known to be invalid or forged domain names. However, a black list is not comprehensive, and a malicious query to resolve a domain name not designated in the list may be processed by the DNS resolver 110. As noted in the above example, the hostnames are randomly generated, thus there is no effect to using black lists.

Another existing technique for detecting DNS-based DDoS attacks is identifying deviations from a normal rate of incoming requests to the DNS resolver 110. Such a technique may be efficient for detecting flood type behavior (a high number of resolver queries in a short time interval), but is not efficient for detecting recursive DNS attacks, which are not characterized by flood behavior. In addition, rate-based detection techniques cannot distinguish between legitimate and attack DNS query results in false positives and requires manual protection.

In an environment where attacks are executed by botnets, manual intervention (by a security administrator) during an attack in order to accurately distinguish between attack "bad" queries and legitimate "good" queries have no effect.

Many existing solutions provide an indication of suspicious DNS activity only when DNS error responses (for example, NXDomain) are generated in high volume. Such detection is often too late for the DNS server, which has already failed due to exhausted resources. Early and accurate detection of a DNS attack based on the incoming queries alone is a key advantage for efficient DNS DDoS protection.

Therefore, it would be advantageous to provide an efficient solution that would cure the deficiencies of existing security solutions in protecting against DNS DDoS attacks.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a system for detecting recursive domain name system (DNS) cyber-attacks. The system comprises a processing circuitry; and a memory, the memory containing instructions that, when executed by the processing circuitry, configure the system to: receive DNS queries directed to a DNS resolver, wherein the DNS resolver is communicatively connected between at least one client and at least one name server; parse each received DNS query to extract a hostname identified therein; update at least one array of Bloom filters using the extracted hostname; compute a ratio of an unrecognized hostnames per sample (UPS) based on the contents of the at least one array; and determine if the UPS ratio is abnormal, wherein an abnormal UPS ratio is an indication of an attack.

Some embodiments disclosed herein include a method for detecting recursive domain name system (DNS) cyber-attacks. The method comprises receiving DNS queries directed to a DNS resolver, wherein the DNS resolver is communicatively connected between at least one client and at least one name server; parsing each received DNS query to extract a hostname identified therein; updating at least one array of Bloom filters using the extracted hostname; computing a ratio of an unrecognized hostnames per sample (UPS) based on the contents of the at least one array; and determining if the UPS ratio is abnormal, wherein an abnormal UPS ratio is an indication of an attack.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
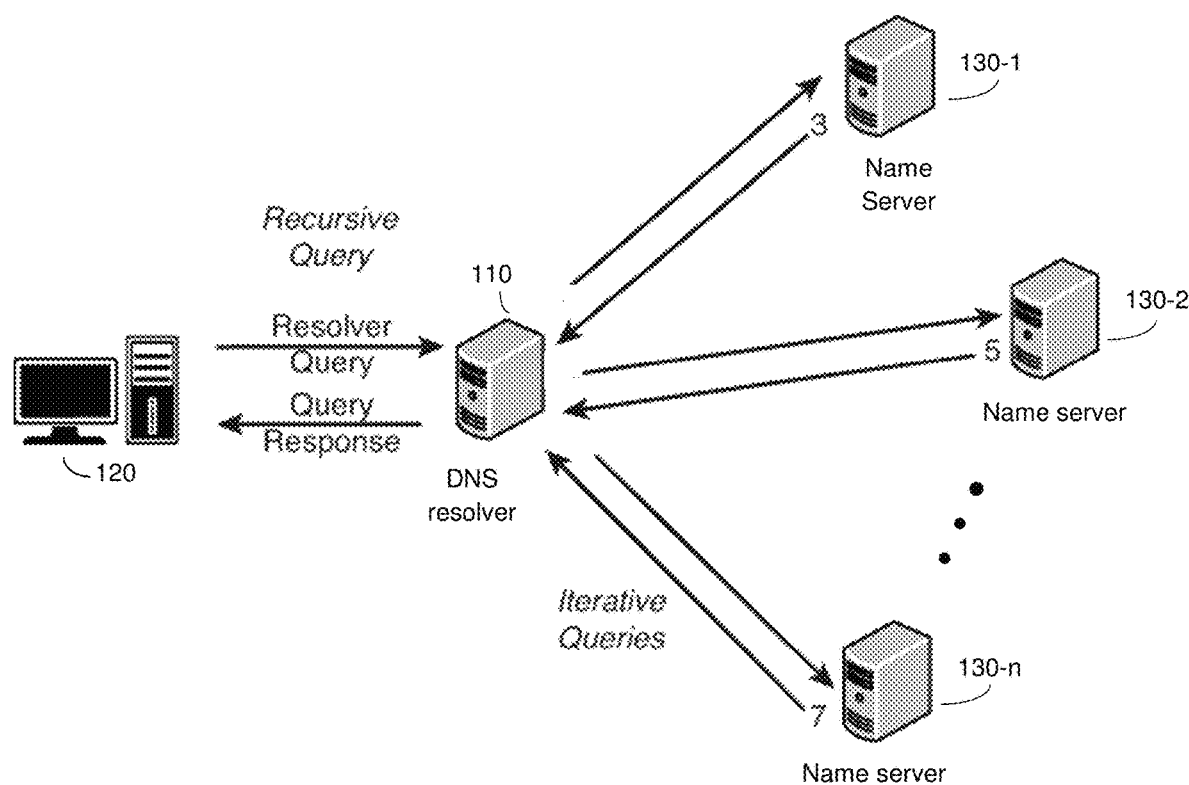
FIG. 1 is a diagram illustrating the operation of a DNS recursive attack.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for early detection of DNS attacks. The detection, in an example embodiment, is based on the identification of an abnormal presence of previously unknown hostnames and the filtering of such hostnames. The identification of an abnormal presence of hostnames, and filtration thereof is based on a modified Bloom filter. In an embodiment, using the Modified Bloom Filter, the ratio of unrecognized hostnames in the total ingress traffic is monitored, and an abnormal value of an estimate of this ratio is identified as indicative of an attack. The ratio value is an estimate of the probability of hostnames to be unrecognized.

Figure 2:
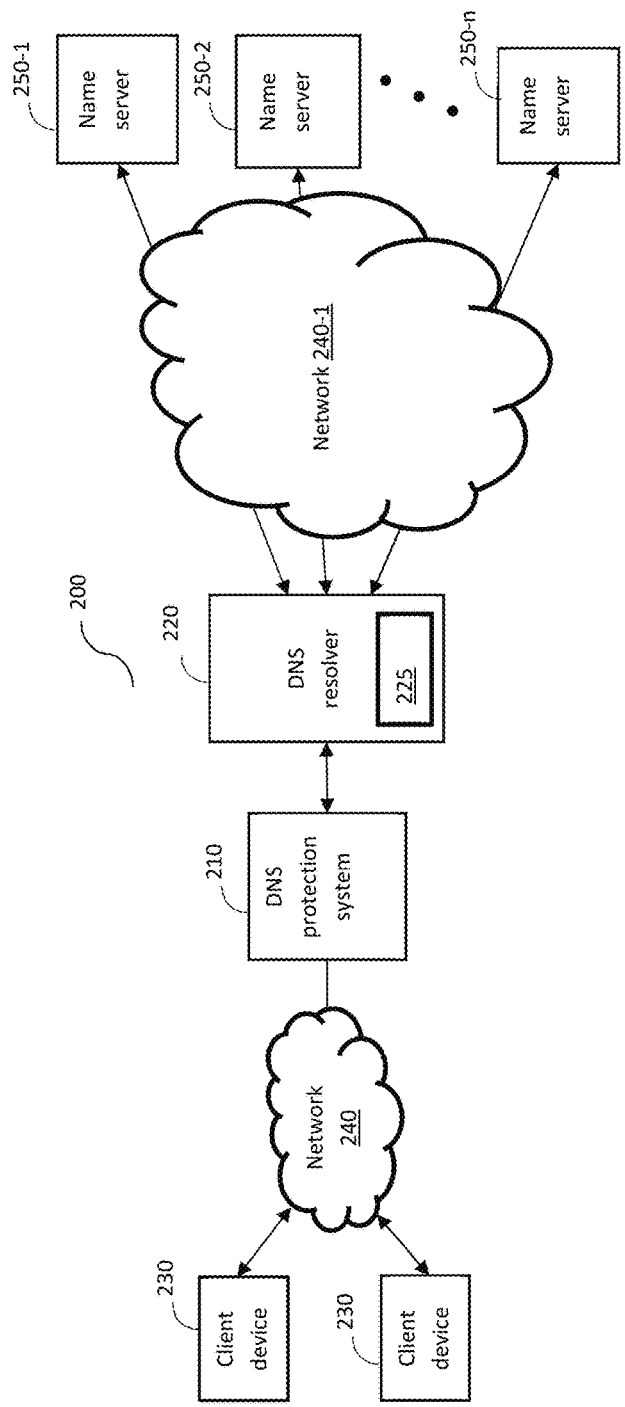
FIG. 2 illustrates a network diagram utilized to describe the various disclosed embodiments.

FIG. 2 shows an example network diagram 200 utilized to describe the various disclosed embodiments. As illustrated in FIG. 2, a domain name system (DNS) protection system 210 is deployed between a DNS resolver 220 and client devices 230-1 and 230-2 (collectively referred to client devices 230, merely for simplicity purposes) via, for example, a network 240. The DNS resolver 220 is further communicatively connected to a plurality of authoritative DNS name servers 250-1 through 250-*n* (hereinafter referred to individually as a "name server" 250 and collectively as "name servers" 250, merely for simplicity purposes).

The client devices 230 may be devices providing legitimate DNS queries to resolve true domain names (e.g., www.google.com) or attacker devices (e.g., bots) that generate malicious DNS queries containing random and forged domain names. That is, attacker devices attempting to execute recursive DNS attacks. The network 240 may be, but is not limited to, a local area network (LAN), a wide area network (WAN), the Internet, similar networks, and any combination thereof. The connection between the DNS resolver 220 and name servers 250 can be facilitated over a network, such as the network 240-1.

As noted above, the DNS resolver 220 returns an IP address corresponding to a domain name in response to a DNS query (request) received from one of the client devices 230. A name server (e.g., the name server 250-1) answers only the queries for the zones (an IP address range) that it is responsible for, in order to quickly respond to resolver queries. A name server 250 does not respond to the recursive queries and does not cache query results.

To resolve the full domain name, the DNS resolver 220 checks if an IP address for the domain name is saved in a cache (225) of the DNS resolver 220. If so, the IP address is returned in a query response. If the query cannot be resolved based on the cached information, the DNS resolver 220 queries a root name server (e.g., the name server 250-1). If the root name server 250-1 is authoritative for the top-level domain, it returns an IP address of a name server (e.g., the name server 250-2) that is capable of resolving the sub domain. However, if the root name server 250-1 is not authoritative for that top-level domain name, a recursive process begins by querying the name servers 250 until the domain name is fully resolved. A fully resolved domain name is cached at the DNS resolver 220 and returned as a query response to the client device 230 that sent the DNS query.

According to the disclosed embodiments, to provide a defense against recursive DNS attacks, the DNS protection system 210 is configured to perform DNS-attack detection and mitigation techniques. Specifically, in the detection mode, the DNS protection system 210 is configured to identify deviations from a normal ratio (an expected probability) of unrecognized hostnames requested to be resolved by the DNS resolver 220. In an embodiment, the normal ratio is determined with respect to a peace time, i.e., a time when no attacks are being performed (where the "alarm" is off). To this end, at least one Modified Bloom Filter that is specifically designed to learn a normal ratio of unrecognized hostname is implemented by the system 210.

The DNS protection system 210 operates in two operation modes: learning and detection. The learning mode is typically timed for a predefined time period (e.g., 24 hours). Alternatively or collectively, the learning mode can be ended when a threshold number of DNS queries has been received. In the detection mode, hostnames designated in the DNS queries are monitored and processed to detect a potential DNS attack, as will be discussed in detail below. The detection mode may further include mitigation of the attacks.

According to the disclosed embodiments, a conventional binary Bloom filter is modified or configured differently to allow learning and detection of an abnormal ratio of unrecognized hostnames (hereinafter "unrecognized hostnames per sample" or "UPS").

A typical empty Bloom filter is a bit array of 'm' bits, all set to '0'. There are 'k' different hash functions defined, each of which maps or hashes a set of elements to one of the 'm' array positions with a quite uniform random distribution. In a typical configuration, 'k' is a constant integer that is much smaller than 'm'. The parameter 'm' is proportional to the number of elements to be added. The values of the parameters 'k' and 'm' are determined by the intended false positive rate of the Bloom filter.

To add an input element to the array, such an element is fed into each of the 'k' hash functions to result with 'k' array locations. All of the bits of the array in the k positions are set to 1.

To query if an element is included in the array, the element is fed into the 'k' hash functions to retrieve their 'k' array locations. If any of the bits at the hashed locations is 0, the element is not in the set. Otherwise, if all bits in the locations are '1', then either the element is in the set, or the bits have by chance been set to '1' during the insertion of other elements, resulting in a false positive. According to the disclosed embodiments, the Bloom filter based solutions implemented by the DNS protection system 210 are modified or otherwise configured to reduce false positives.

Figure 3:
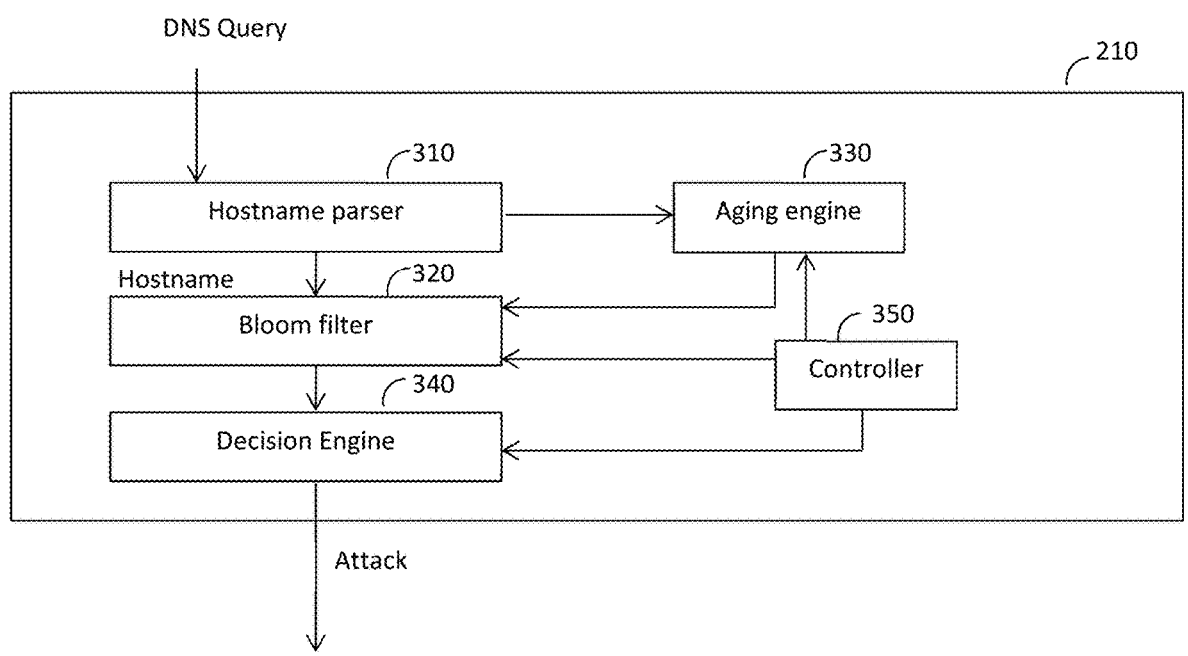
FIG. 3 is a block diagram illustrating the operation of the DNS protection system designed according to an embodiment

FIG. 3 shows an example block diagram illustrating the operation of the DNS protection system 210 according to an embodiment. The system 210 includes a hostname parser 310, a Bloom filter 320, an aging engine 330, a decision engine 340, and a controller 350. The hostname parser 310 is configured to parse DNS queries sent from client devices (230, FIG. 2) to the DNS resolver (250). The hostname parser 310 is configured to make a copy of the query (DNS request) and parse the copied query. The DNS queries can be parsed to extract the domain names (e.g., full or sub domain names designated therein). In an embodiment, each DNS query is parsed to retrieve the hostname.

The parsed query hostnames are fed into the Bloom filter 320 that includes at least one array and a hash processor (not shown in FIG. 3). The various embodiments of implementing the Bloom filter 320 is discussed with reference to FIGS. 4A through 4C. The aging engine 330 is configured to reset or delete certain elements maintained by the filter's 320 array at a predefined time interval or upon other rules. In an embodiment, the aging engine 330 is configured to delete certain elements having an old timestamp or a low counter value compared to other elements. In certain implementations, when the Bloom filter 320 includes two arrays, there is no need to delete obsolete or low-active elements, as all elements are regularly initialized. It should be noted that cleaning old or obsolete elements from the filter's array 320 reduces the number of false positives as the filter 320 maintains only current learnt elements.

The aging engine 330 can operate under the control of the controller 350. In an embodiment, the controller 350 is also configured to switch the operation mode from learning to detection, and to prevent learning during an attack.

The decision engine 340 is configured to determine if there is an ongoing attack based on the contents of the Bloom filter 320. Specifically, the decision engine 340 is configured to determine if the UPS is normal or abnormal. In an example embodiment, a UPS value over a certain statistical threshold is determined as a potential attack. This threshold is adaptively learnt as will be discussed in detail below. Upon detection of a potential attack, one or more mitigation actions can be performed. The mitigation actions may include firing an alert.

In an embodiment, the various components shown in FIG. 3 can be implemented in hardware, software, or a combination thereof. The hardware may include memory with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The software is stored in a machine-readable media and shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions are executed by a processing circuitry or otherwise by hardware. An example block diagram illustrating a hardware implementation of a DNS protection system 210 is provided in FIG. 7.

Figure 4A:
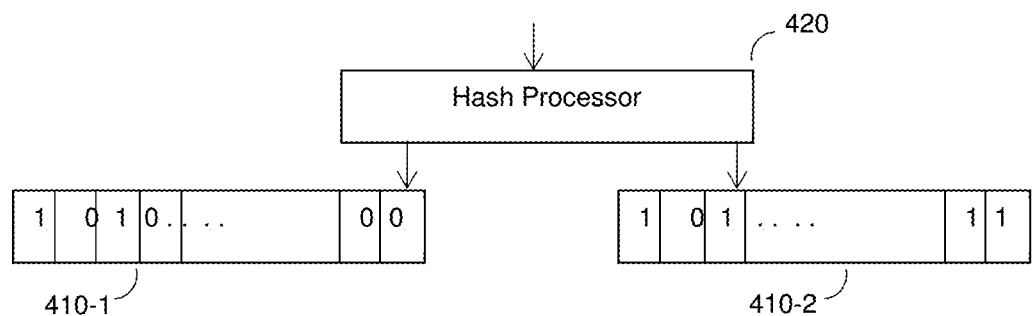
FIGS. 4A, 4B, and 4C are block diagrams of various Bloom filters modified according to the disclosed embodiments.

FIG. 4A shows an example Bloom filter 320 according to an embodiment. In this embodiment, two arrays (or buffers) 410-1 and 410-2 are utilized. The hash functions computed by a hash processor 420 are the same for both arrays 410-1 and 410-2. The hash processor 420 computes a set of 'k' hash functions over the received host name to result with 'k' pointers pointing to 'k' elements in each of the arrays 410-1 and 410-2. In an example embodiment 'k=20', i.e., 20 hash functions are being utilized.

According to the disclosed embodiments, each hash function is computed using look-up tables filled with random sequences. Each such sequence is defined using a random seed at the instance utilization. The hash function is not computed using conventional hash function, such as MurmurHash, FNV hashes, Jenkins Hashes, and CityHash, as such functions are known to be vulnerable.

In this implementation, each of the arrays 410-1 and 410-2 include a number of 'm' bits, i.e., both arrays have the same size. The array 410-1 is a passive array utilized for learning, while the array 410-2 is an active array utilized for the detection. The contents of the array 410-2 is periodically updated with the contents of the array 410-1. Concurrently, the array 410-1 may be initialized to a set of initial values. Alternatively, the contents of the array 410-1 are duplicated so to hold the last state after, for example, an interruption.

Initially, the array 410-1 is set to '0' values, and then updated (i.e., set appropriate elements to '1') during the learning mode based on the hash values. The active array 410-2 is not updated during the mode. In an example embodiment, the size of each element in each of the arrays 410-1 and 410-2 is 1 bit. Both arrays hold binary values '0' or '1', determined based on the hash functions computed over the hostnames. In an example, '1' at all k elements corresponding to a hostname in the array indicates that this hostname could be already observed (there is some probability of false positive), while '0' in at least one of k elements indicates that hostname was not observed. Thus, a received hostname is mapped (hashed) using the hash processor 420 to one or more elements the learning array 410-1.

In the detection mode, the active array 410-2 is queried as to whether a hostname was recently encountered. That is, the element(s) in the array 410-2 for the host name is determined using the hash processor 420; if such element(s) includes '1', then the host name seems to be recently encountered. Hostnames are parsed from received DNS queries.

In an embodiment, the functions of the arrays 410-1 and 410-2 are alternated. That is, a first array may be used for updating elements (based on incoming hostnames) while a second array may be actively utilized for the detection.

Figure 4B:
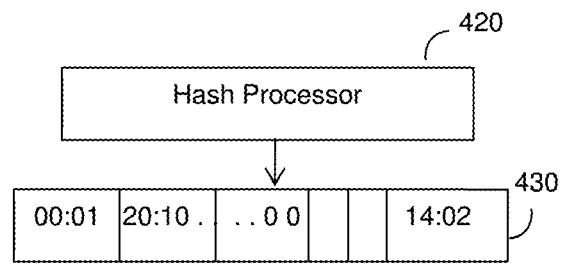

FIG. 4B shows an example of the Modified Bloom Filter 320 according to another embodiment. In this embodiment, a single array (or buffer) 430 and a hash processor 420 are utilized. The array 430 is configured to maintain integer timestamps. An element in the array is updated with a timestamp of the last DNS query. That is, when a hostname is hashed to k elements in the array 430, a timestamp of the respective DNS query is set in such elements. The elements of the array 430 may be deleted (e.g., set to zero) when such elements have been 'aged.' In the detection mode, elements' value of the array 430 that are different than '0' are considered when determining the UPS indicator values. In an example embodiment, the size of each element in the arrays 430 may be between 2 bits and 16 bits.

In an embodiment, as a variation of the Modified Bloom Filter with timestamps, the aged elements are not deleted at all. Rather, in computation of the UPS, only elements i having timestamps $t_i$ that differ from the current hostname's time t by a value less than a preconfigured or learned time interval (oblivion time) $t_{ob}$ are considered as recognized. Thus, the recognized hostname has each of k pointers to elements with timestamps being older than its own pointer at most by oblivion time $(t-t_i \leq t_{ob})$; while unrecognized hostname has at least one of k pointers pointing to an element with timestamp older than its own at value greater than oblivion time $(t-t_i \leq t_{ob})$.

Figure 4C:
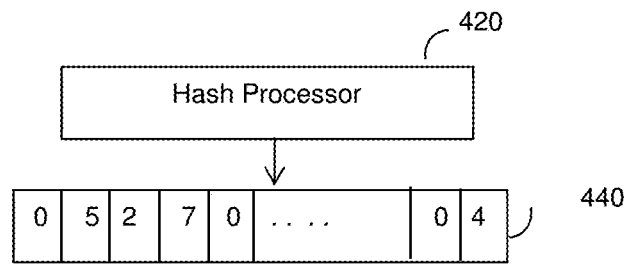

FIG. 4C shows an example of the Modified Bloom Filter 320 according to another embodiment. In this embodiment, a single array (or buffer) 440 and a hash processor 420 are utilized. The array 440 is configured to maintain integer counters. An element in the array is initially set to zero (0) incremented by one (1) when a hostname is mapped to a particular element. That is, when a hostname is hashed to k elements in the array 440, a counter value in those locations is increased by 1. The elements of the array 440 may be periodically deducted by a predefined integer constant value. In an example embodiment, the size of each element in the arrays 430 may be 4-8 bits.

It should be noted that in the detection mode it is important only, whether the elements' value of the array 440 are different than '0', or not. Accordingly, elements with values different than '0' are not considered when determining the UPS indicator.

In all the above embodiments, to hash the entire namespace of hostnames (e.g., about a million), the number of hash functions being used is chosen according required false positive probability. An optimal number of hash functions k depends only on required false positive probability p:

$$k = \log_2 \frac{1}{p} \approx 3.322 \, lg\frac{1}{p}.$$

For example, if $p=10^{-3}$, then k=10.

The size, i.e., number of elements 'm,' of the array is proportional to the expected number of the most popular (for given protected server) different hostnames and to the number of hash functions, which in its turn in the optimal case depends on required false positive probability:

$$N = \frac{kn}{lg2} \approx 3.322kn.$$

For example, 'm' may be equal to $33 \times 10^6$ if the expected number of hostnames is about 1,000,000 and the required false positive probability is $10^{-3}$.

Figure 5:
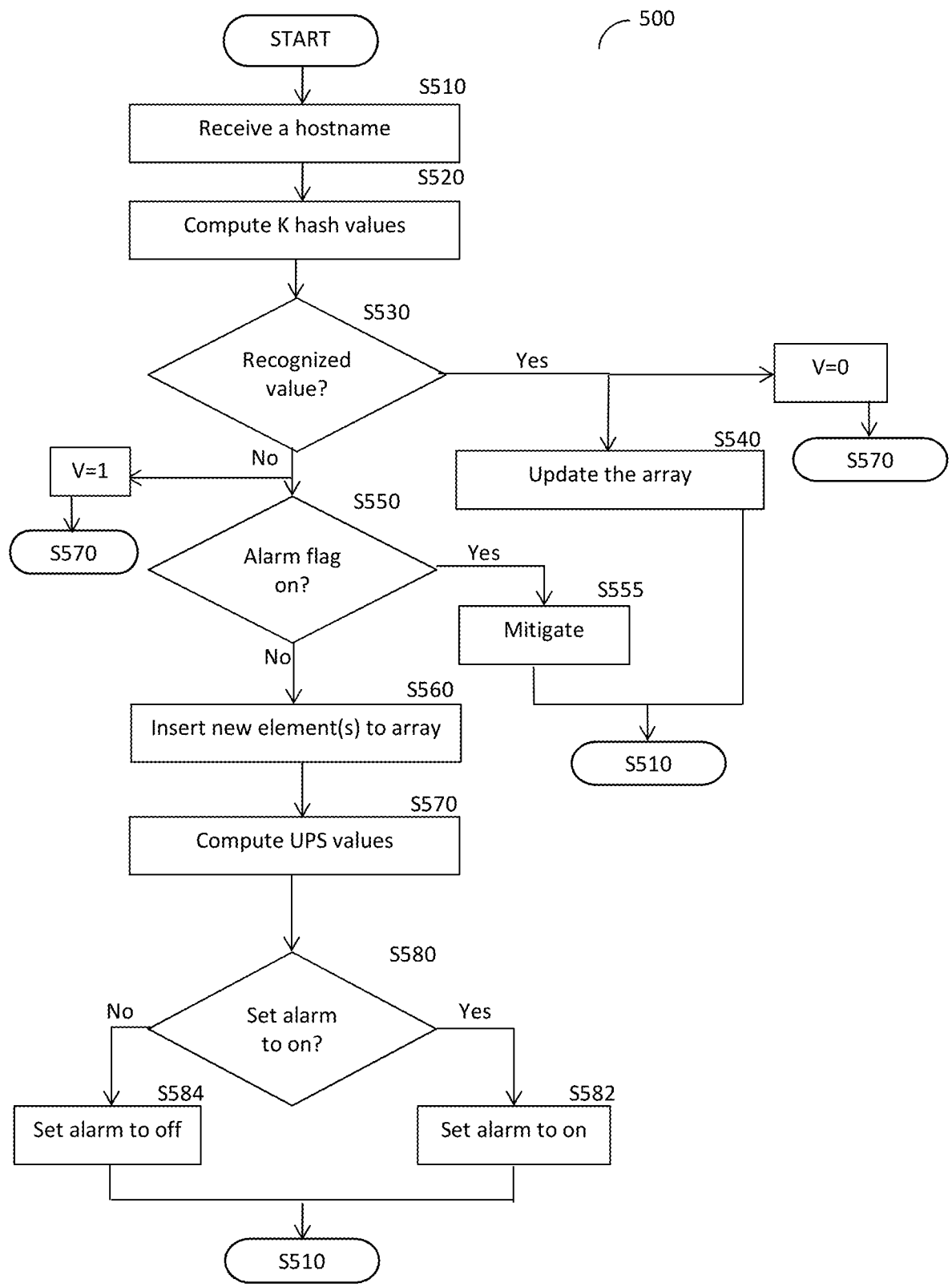
FIG. 5 is a flowchart illustrating a method for detecting a DNS attack according to one embodiment.

FIG. 5 shows an example flowchart 500 illustrating a method for detecting a DNS attack according to one embodiment. Specifically, the method can be performed using a DNS protection system 210 implementing with a Bloom filter including a single array as shown in FIGS. 4B and 4C.

At S510, a hostname is received. The hostname may be parsed out from a DNS query sent from a client device to a DNS resolver. A format of a hostname is exemplified above.

At S520, a number of 'k' hash values are computed over the received hostname using a set of predefined 'k' hash functions. That is, the hostname is hashed to create a k-dimensional vector of pointers pointing to elements in the Bloom filter's array.

At S530, a check is made if there is a recognized value in each element pointed by each hash value. In an embodiment, a recognized value may be a value different than zero, for example, a counter value or a timestamp. As an example, if a hash function results in a pointer pointing to the element having a value of 0, the respective element cannot be assigned before by any previous input (at least, during a time interval when its value not expired). That is, the respective hostname (on which the function was computed on) has not been encountered before and is considered as unrecognized.

If S530 results with a 'yes' answer, execution continues with S540 where the contents of the array of the respective "pointed" elements are updated. For example, the count value may be incremented, or the recent timestamp may be saved in the respective elements.

If S530 results with a 'no' answer, execution continues with S550, where it is checked if an alarm flag is on. The alarm flag is set to 'on' upon detection of a deviation from a normal ratio of the UPS. If so, at S555 a mitigation action is executed or triggered and execution returns to S510. Otherwise, at S560, the respective "pointed" elements are updated with a new value, e.g., changing a counter value to 1 or recording a timestamp indicating a reception time of the hostname.

In addition, execution proceeds from S530 to S570. Specifically, when S530 results with a 'yes' answer, "V=0"; Otherwise, "V=1". The value V is used to update the UPS indicator.

At S570, the baseline and standard deviation values of the current UPS indicator is updated based on the contents of the array. Specifically, a current UPS indicator (of a current sample) is first updated based, in part, on a previous UPS indicator value (of a previous sample). In an example embodiment, a sample is every incoming hostname, i.e., the UPS indicator value is updated upon reception of every hostname. Thus, the detection is rate-invariant.

In an embodiment, the UPS indicator value (U) is updated using the following equation:

$$\begin{cases} U \leftarrow (1-\gamma)U + \gamma V \\ U(0) = U \text{ (last learned)} \end{cases} ; \qquad \text{EQ. 1}$$

where, V=0 if an element is recognized; otherwise, V=1, and γ is a fading coefficient. As an example, 'γ' is equal to 0.01. It should be noted in the learning mode, U(0) is set to zero (U(0)=0), or to the last kept value (previously learned) to save convergence time. The value of U is 0<U<1, and may approach to 1 only under high intensive attack.

Then, a baseline (Y) of the UPS indicator value (U) is periodically computed. In an embodiment, the baseline (Y) of the UPS indicator value (U) is computed using the following equation:

$$\begin{cases} Y \leftarrow (1-\alpha)Y + \alpha U \\ Y(0) = Y \text{ (last learned)} \end{cases} ; \qquad \text{EQ. 2}$$

where, the fading coefficient 'α' is inversely proportional to the sampling frequency for updating the baseline, i.e., the shorter the sampling frequency, the smaller the value of 'α' is.

Based on the baseline and counter values (Y and U), the variance (varU) of the UPS indicator value (U) is computed using the following equation:

$$\begin{cases} \text{var}U \leftarrow (1-\alpha)\text{var}U + \alpha(U-Y)^2 \\ \text{var}U(0) = \text{var}U \text{(last learned)} \end{cases} ; \qquad \text{EQ. 3}$$

The standard deviation standard deviation, σ, is the root square of the variance, i.e.:

$$\sigma = \sqrt{\text{var}U}; \qquad \text{EQ. 4}$$

At S580, it is checked if the status alarm flag should be set to 'on', and if so, at S582 the alarm flag is set to 'on'; otherwise, at S584, the alarm flag is set to 'off'. In an embodiment, the alarm flag is set to 'on' when the UPS indicator value (U) exceeds a first threshold ($T_1$). This would be indicative on a potential DNS attack. The alarm flag is set to 'off' when the UPS indicator value (U) is below a second threshold ($T_2$). This would be indicative that a DNS attack is over or have been mitigated successfully.

In an embodiment, the first and second thresholds are adaptive statistical thresholds determined based on the baseline and standard deviation of the UPS indicator value (U). In an example embodiment, the values of first ($T_1$) and second ($T_2$) thresholds may be determined as follows:

$$\begin{cases} T_1 = Y + 4\sigma \\ T_2 = Y + 3\sigma \end{cases}$$

That is, if $U>T_1$, at S582 the alarm flag is set to 'on'; otherwise, only if $U<T_2$, at S584 is the alarm flag set to 'off'. S584 may further include halting any active mitigation action.

The method discussed herein with reference to FIG. 5, is performed during the detection mode as long as new hostnames are received. It should be further noted the elements of the array are updated using the aging engine as discussed below. This ensures that the obsolete elements values do not affect the detection, thus reducing the number of false positive.

Figure 6:
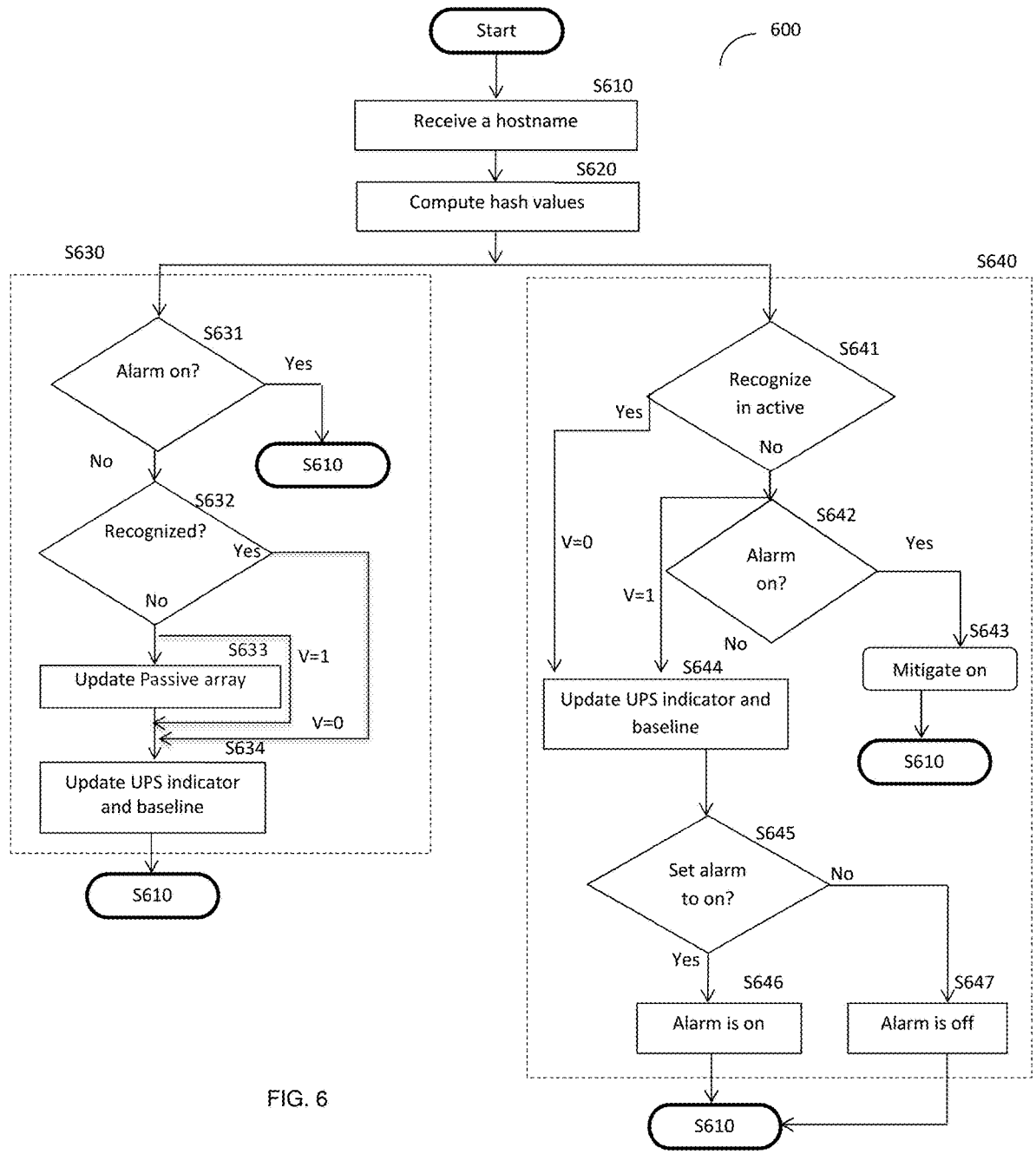
FIG. 6 is a flowchart illustrating a method for detecting a DNS attack according to another embodiment.

FIG. 6 shows an example flowchart 600 illustrating a method for detecting a DNS attack according to another embodiment. The method of FIG. 6 can be performed using a DNS protection system 210 implementing a Bloom filter including two arrays as shown in FIG. 4A. For the sake of simplicity of the discussion, the two arrays are referred to hereinafter as a "passive array" and an "active array". The passive array is used for learning and the active array is used for detection.

At S610, a hostname is received. The hostname may be parsed out from a DNS query sent from a client device to a DNS resolver. At S620, a number of 'k' hash values is computed over the hostname using a set of predefined 'k' hash functions. That is, the hostname is hashed to create a k-dimensional vector of pointers pointing to elements in the Bloom flitter's array. Then, the parallel processing of passive and active arrays is performed, as demonstrated at S630 and S640 of FIG. 6, respectively.

At S631, it is checked if an alarm flag is 'on'; if so, execution returns to S610; otherwise, execution proceeds with S632. At S632, a check is made if there is a recognized value in each element in the passive array, pointed by each hash function. In an embodiment, a recognized value may be a bit including '1' in the respective element.

If S632 results with a 'no' answer, execution continues with S633 where the contents of the respective "pointed" elements in the passive array are updated. For example, the bit of the respective element is set to '1'. Then, at S634, the UPS indicator value (U) of the passive array is updated using, for example, EQ. 1, above. It should be noted that the execution proceeds to S634 from S632 when S632 results with a 'yes' answer, "V=0"; otherwise, "V=1". The value V is used to update the UPS indicator.

It should be noted that the passive array is updated as long as new hostnames are received at S610 and the alarm flag is set to 'off'.

At S641, a check is made if there is a recognized value in each element in the active array, pointed by each hash function. If S641 results with a yes answer, execution continues with S644; otherwise, execution continues with S642, where it is checked if an alarm flag is 'on'. If so, at S643, a mitigation action is executed or triggered, and execution returns to S610. Otherwise, execution continues with S644.

In any event, S644 is executed, where a current UPS indicator, its baseline, and standard deviation values are computed based on the contents of the active array. Example embodiments for computing these values are discussed above. It should be noted that the execution proceeds to S644 from S641 when S641 results with a 'yes' answer, "V=0"; otherwise, "V=1". The value V is used to update the UPS indicator.

At S645, it is checked if the alarm flag should be set to 'on', and if so at S646 the alarm flag is set to 'on'; otherwise, at S647, the alarm flag is set to 'off'. In an embodiment, the alarm flag is set to 'on' when the UPS active counter value exceeds a first threshold ($T_1$). This would be indicative on a potential DNS attack. Otherwise, the alarm flag is set to 'off' when the UPS active counter value is below a second, lesser threshold ($T_2$). This would be indicative that a DNS attack is over and there is no need to continue mitigation. The first and second thresholds are adaptive statistical thresholds determined based on the baseline and standard deviation of the UPS active counter value in peacetime. Examples for setting the thresholds' values are provided above.

It should be noted that the contents of active array are updated with contents of the passive array. The time for such operation may be based on time (e.g., every 1 week), number of insertions to the passive array, or the number of elements in the passive arrays that are not '0'. For example, if the number of free elements (bits set to '0') is less than half of the array size (m), then both arrays are refreshed.

The method discussed herein with reference to FIG. 6 is performed during the detection mode as long as new hostnames are received. This ensures the obsolete elements values would not affect the detection, thus reducing the number of false positive. Specifically, in an embodiment, the passive array's contents are periodically copied to the active array (and the same, correspondingly, with UPS and thresholds). After copying the contents of the passive array, the passive array is cleaned, while the last values of 'active' UPS and Y could be assigned as initial values to the passive counterparts (see EQ. 1-3).

In both the embodiments discussed with reference to FIGS. 5 and 6, the detection mode is performed simultaneously and during a learning mode, where a single array is filled based on the hashed values computed over received hostname. Also, the UPS indicator value is initially set to zero and updated based on the equation (EQ. 1) shown above.

Figure 7:
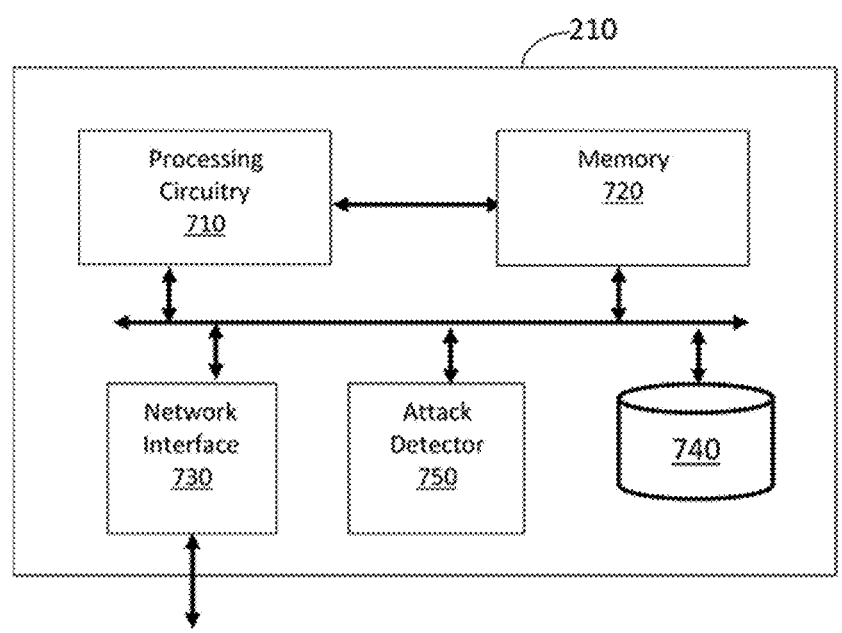
FIG. 7 is an example block diagram of the DNS protection system according to another embodiment.

FIG. 7 shows an example block diagram of the DNS protection system 210 according to an embodiment. The DNS protection system 210 is configured to detect recursive DNS attacks. The DNS protection system 210 includes a processing circuitry 710 coupled to a memory 720, a network interface 730, a storage 740, and an attack detector 750.

The network interface 730 is configured to allow communication with client devices, DNS resolvers, name servers, external systems, or a combination thereof. The processing circuitry 710 may comprise, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logics, discrete hardware components, dedicated hardware finite state machines, or any other suitable entities that can perform calculations or other manipulations of information.

The processing circuitry 710 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing unit, cause the processing unit to perform the various functions discussed herein.

The memory 720 may comprise volatile memory components, non-volatile memory components, or both, including, but not limited to, static random-access memory (SRAM), dynamic random-access memory (DRAM), flash memory, magnetic memory and other tangible media on which data, instructions, or both may be stored. The memory 720 may contain instructions that, when executed by the processing circuitry 710, performs, for example and without limitations, the processes for detecting recursive DNS attacks as described in more detail in above. The memory 720 may also include a white list of domain names.

The storage 740 may be configured to store learned baselines, request and response rates, ratios, distributions of domain names having different lengths, distributions of common domain names, analysis results, or a combination thereof. The storage 740 may be realized as a magnetic storage, optical storage, and the like, and may be realized, for example, as flash memory or other memory technology, CD-ROM, in-memory database technologies, Digital Versatile Disks (DVDs), or any other medium which can be used to store the desired information.

The attack detector 750 is configured to perform a process for detection and mitigation of recursive DNS attacks as described in greater detail herein above with reference to FIGS. 5-6. The attack detector 750 can be realized by any discrete hardware components, dedicated hardware finite state machines, or any other suitable entities that can perform calculations or other manipulations of information. In an embodiment, the attack detector 750 may implement the Bloom filter discussed with respect to FIGS. 4A, 4B, and 4C.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting recursive domain name system (DNS) cyber-attacks, comprising:
   receiving DNS queries directed to a DNS resolver, wherein the DNS resolver is communicatively connected between at least one client and at least one name server;
   parsing each received DNS query to extract a hostname identified therein;
   updating, using the extracted hostname, at least one element in at least one array of a Bloom filter;
   computing a ratio of an unrecognized hostnames per sample (UPS) based on the contents of the at least one array; and
   determining if the UPS ratio is abnormal, wherein an abnormal UPS ratio is an indication of an attack.

2. The method of claim 1, further comprising:
   learning a normal UPS ratio during a predefined learning period.

3. The method of claim 2, wherein the learning period is active during a peace time.

4. The method of claim 1, further comprising:
   upon detection of at least one anomaly, performing at least one mitigation action to filter out incoming DNS queries to a domain name under attack.

5. The method of claim 1, wherein updating the at least one array of Bloom filters using the extract hostname further comprises:
   computing a plurality of hash functions, using at least one look-up table, to derive a plurality of hash values pointing to a plurality of elements in the at least one array, wherein the at least one look-up table includes randomly generated sequences;
   checking if a recognized value exists in each element pointed to by each hash value;
   updating values of elements of the at least one array that include recognized values; and
   inserting new values in elements of the at least one array that include unrecognized values.

6. The method of claim 5, wherein the at least one array of Bloom filters is configured to maintain integer values, and wherein updating the values of elements includes increasing a value of each pointed element by one.

7. The method of claim 5, wherein the at least one array of Bloom filters is configured to maintain timestamp values, and wherein updating the values of elements includes recording at each pointed element a timestamp of the reception of a respective DNS query.

8. The method of claim 5, wherein the at least one array of Bloom filters is configured to maintain binary values, and wherein inserting new values in elements includes setting a value of each pointed element to a logic one value.

9. The method of claim 5, wherein computing the UPS ratio further comprises:
   computing a current UPS indicator value based on the elements' values of the at least one array, wherein the current UPS indicator is computed as a function of recognized elements, a last learned value of the UPS indicator, and a predefined fading coefficient.

10. The method of claim 9, wherein the current UPS indicator is value rate-invariant.

11. The method of claim 9, further comprising:
    computing a baseline of the UPS indicator value, wherein the baseline is a function of the current UPS indicator, a last learned value of the baseline, and a predefined fading coefficient;
    computing a variance of the UPS indicator value, wherein variance of the UPS indicator value is a function of a last learned value of the variance, a deviation of the current UPS indicator from the baseline, and a predefined fading coefficient; and
    computing a standard deviation value using the variance of the UPS indicator value.

12. The method of claim 9, wherein determining if the UPS ratio is abnormal further comprises:
    comparing the current UPS indicator value to a first threshold and a second threshold, wherein the first threshold and the second threshold are set based on the computed standard deviation and the baseline of the current UPS indicator.

13. The method of claim 12, wherein the first threshold is indicative of an ongoing DNS cyber-attack and the second threshold is indicative that the DNS cyber-attack is over, wherein the first threshold is greater than the second threshold.

14. The method of claim 1, wherein the at least one array includes two arrays, wherein a first array of the two arrays is used for learning and a second array of the two arrays is used for the detection, wherein contents of the second array are updated with contents of the first array.

15. The method of claim 1, wherein the detected and mitigated cyber-attack is at least a DNS-based distributed denial-of-service (DDoS) attack.

16. A non-transitory computer readable medium having stored thereon instructions for causing a processing circuitry to execute a process for detecting recursive domain name system (DNS) cyber-attacks, the process comprising:

receiving DNS queries directed to a DNS resolver, wherein the DNS resolver is communicatively connected between at least one client and at least one name server;

parsing each received DNS query to extract a hostname identified therein;

updating, using the extracted hostname, at least one element in at least one array of a Bloom filter;

computing a ratio of an unrecognized hostnames per sample (UPS) based on the contents of the at least one array; and determining if the UPS ratio is abnormal, wherein an abnormal UPS ratio is an indication of an attack.

17. A system for detecting recursive domain name system (DNS) cyber-attacks, comprising:

a processing circuitry; and a memory, the memory containing instructions that, when executed by the processing circuitry, configure the system to:

receive DNS queries directed to a DNS resolver, wherein the DNS resolver is communicatively connected between at least one client and at least one name server;

parse each received DNS query to extract a hostname identified therein;

update, using the extracted hostname, at least one element in at least one array of a Bloom filter compute a ratio of an unrecognized hostnames per sample (UPS) based on the contents of the at least one array; and determine if the UPS ratio is abnormal, wherein an abnormal UPS ratio is an indication of an attack.

18. The system of claim 17, wherein the system is further configured to:

learn a normal UPS ratio during a predefined learning period.

19. The system of claim 18, wherein the system is further configured to:

perform at least one mitigation action to filter out incoming DNS queries to a domain name under attack, upon detection of at least one anomaly.

20. The system of claim 18, wherein the system is further configured to:

compute a plurality of hash functions, using at least one look-up table, to derive a plurality of hash values pointing to a plurality of elements in the at least one array, wherein the at least one look-up table includes randomly generated sequences;

check if a recognized value exists in each element pointed to by each hash value;

update values of elements of the at least one array that include recognized values; and insert new values in elements of the at least one array that include unrecognized values.

21. The system of claim 20, wherein the detected and mitigated cyber-attack is at least a DNS-based distributed denial-of-service (DDoS) attack.

* * * * *